Figure 1:
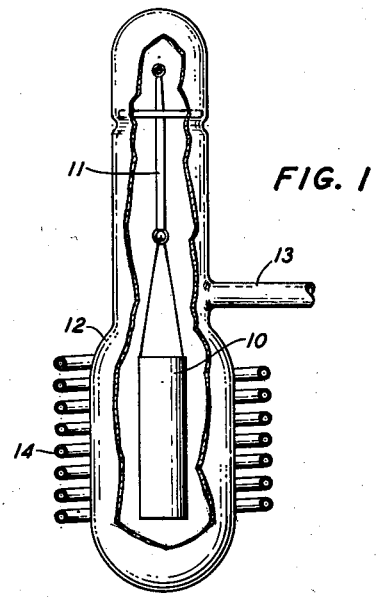

March 23, 1943.  J. R. C. BROWN, JR., ET AL  2,314,816
METHOD OF DESULPHURIZING CARBON COATED METALS
Filed Sept. 11, 1940

INVENTORS: J. R. C. BROWN, JR.
L. A. WOOTEN
BY
Walter C. Kiesel
ATTORNEY

Patented Mar. 23, 1943

2,314,816

UNITED STATES PATENT OFFICE

2,314,816

METHOD OF DESULPHURIZING CARBON COATED METALS

Joshua R. C. Brown, Jr., Jackson Heights, N. Y., and Leland A. Wooten, Maplewood, N. J., assignors to Bell Telephone Laboratories, Incorporated, New York, N. Y., a corporation of New York Application September 11, 1940, Serial No. 356,272

13 Claims. (Cl. 148—13.1)

This invention relates to methods of desulphurizing metals and, more particularly, to removing sulphur from carbonized metals.

In electron discharge devices having a power rating of five watts or more, the anode or plate electrode is coated with a carbon film or layer to increase the dissipation of heat generated during the operation of the device. The electron source of such a device may be of the oxide coated type which is very sensitive to poisonous matter evolved during operation, which materially reduces the efficiency of the device or completely destroys the activity of the oxide coating of the emitter.

Analysis has shown that this poisoning action is caused by sulphur, metal sulphide and other sulphurous compounds inherent in the metal of the electrodes, principally the nickel anode, due to manufacturing procedures, such as electrolytic production of the metal. The carbonizing treatment of the metal to form the carbon layer appears to increase the sulphur content by impurities in the carbonizing gas and the cumulative action of carbonizing reactions.

Attempts to produce sulphur-free nickel by controlled procedure of both the nickel manufacture and the carbonizing treatment results in high cost, involved chemical technique and small output from a commercial standpoint, so that production is unsatisfactory with regard to reproducible specimens. Similar results are obtained when the sulphur is removed from grade A nickel and the carbonizing treatment is controlled to avoid sulphur contamination. The sulphur content of grade A nickel is generally of the order of .005 per cent. The sulphur content of the carbon layer is often as high as 0.1 per cent so that sulphur poisoning represents a serious hazard to the efficiency and life of electronic discharge devices.

An object of this invention is to eliminate poisoning of the sensitive oxide coating of emitters in electron discharge devices.

Another object of the invention is to expel all dissociable sulphurous matter from carbonized metal in an expeditious manner suitable for mass production.

A further object of the invention is to facilitate the treatment of carbonized metal without injury to the carbon coating.

These and other objects of the invention are achieved in accordance with one aspect in which a carbonized electrode, such as an anode, is enclosed in a vacuum chamber and heated to a high temperature for a definite period while introducing pure hydrogen gas at a low pressure. This arrangement forms an efficient static system for the elimination of sulphur and sulphurous compounds from the metal and coating without injuring the coating as to adherence and composition.

In another aspect of the invention, the treatment of the carbonized metal electrode is performed in a flow system at atmospheric pressure in which the electrode is heated to a high temperature in a mixture of a reducing gas and a hydrocarbon gas, such as hydrogen and methane, to facilitate the removal of sulphur compounds from the metal and coating. The proportion of hydrocarbon gas in the reducing mixture must be sufficiently great to prevent the removal of carbon from the carbonized electrode and not so great that additional carbonization occurs. In the case of hydrogen and methane, the proportion of methane must at least be equal to that in the mixture in equilibrium with carbon at the temperature of treatment. This arrangement permits mass production treatment of the electrodes to provide electrodes for discharge devices in which the sulphur content is reduced to a negligible value, for instance, .0001 per cent.

Figure 2:
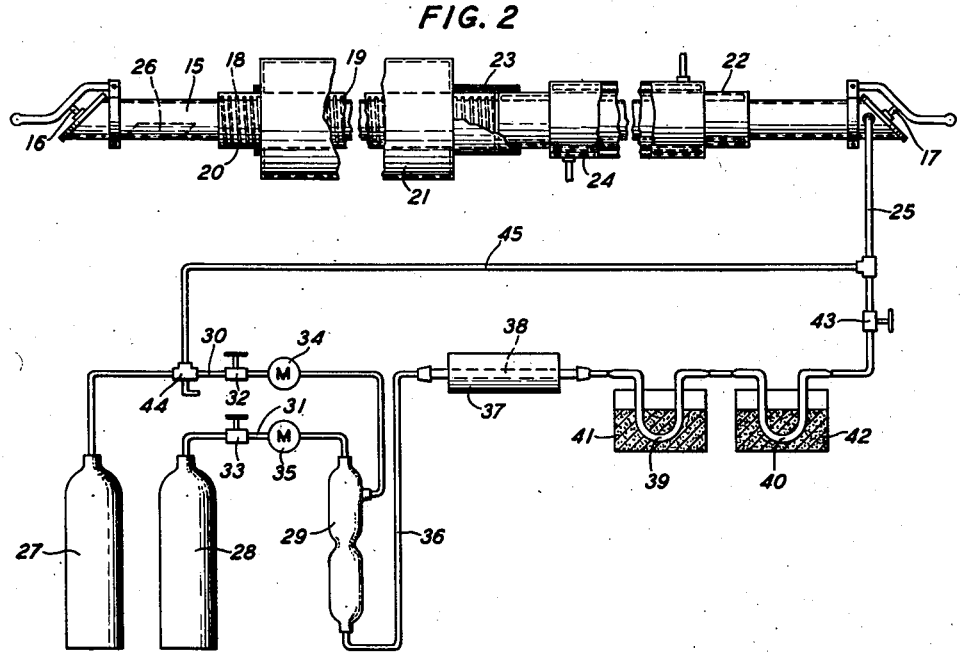

These methods of treatment will be more clearly understood from the following detailed description taken in connection with the accompanying drawing:

Fig. 1 shows one form of apparatus, partly in section and partly broken away, for the static system of treatment of the electrode; and Fig. 2 illustrates a flow system partly in section and partly diagrammatic for processing the electrode in accordance with this invention.

The sulphur content of commercial nickel, while variable, is usually of the order of .005 per cent. The preparation of the nickel by carbonizing to dissipate the heat during operation in an electron discharge device causes a concentration of sulphur compounds in the coating by the addition of impurities from the carbonizing gas and accumulative effects in the carbon precipitation whereby sulphur and sulphur compounds are occluded in the carbon layer so that the total sulphur content of the coating may attain a concentration as high as 0.1 per cent. The complete removal of sulphur from the metal and from the carbonizing gas is a time consuming and expensive process even on a laboratory scale. Assuming that a sulphur-free product could be economically produced, there is always the problem of preventing sulphur contamination during fabrication and storage.

In accordance with this invention all of the sulphur and sulphur products which readily form gases are completely removed and the carbonized nickel purified to such an extent that above 90 per cent of the total sulphur is removed and the sulphur content reduced to as low as .0001 per cent. This minimum represents sulphur which is not removed from carbonized nickel at temperatures below 1050° C. and therefore would not be released in an electron discharge device to poison the active coating on the emitter.

One method of desulphurizing the carbon coated electrode is shown in Fig. 1 in which a carbonized tubular nickel anode 10 is supported by a hanger 11 in a glass chamber 12 provided with an exhaust tabulation 13. The chamber is evacuated to a high degree to remove air, water vapor and other gases, and a supply of a reducing gas, such as purified hydrogen, is injected into the chamber at a pressure of from 12 to 15 centimeters of mercury. When this static condition is secured, the electrode is heated inductively by a high frequency coil 14 which surrounds the chamber, and the electrode is heated to a temperature of 950 to 1050° C. for approximately one hour to liberate all the dissociable sulphur and sulphur compounds in the metal and coating without removing or changing the carbon coating. The sulphur gases formed are removed by condensation in the usual liquid air trap to effectively prevent their recombination with the carbon coated eelctrode. The gas filling is withdrawn from the chamber and the electrode is permitted to cool to room temperature after which the chamber may be opened and the electrode removed for fabrication in a discharge device. The hydrogen combines with sulphur and metal sulphide to form hydrogen sulphide and the hot carbon layer itself reacts with sulphur in the metal and the coating to form gaseous sulphur compounds, such as carbon disulphide and carbon oxysulphide.

Fig. 2 shows another method in accordance with this invention in which the carbonized metal electrode is desulphurized in a flow system at atmospheric pressure in which a reducing gas and a hydrocarbon gas, such as hydrogen and methane, respectively, in the ratio of an equilibrium mixture is injected into a heating zone to eliminate sulphur and sulphur compounds from the metal and carbon film to such an extent that only an immaterial residue remains, i. e., .0001 per cent. In this system a non porous tubular chamber or furnace 15, such as a "Nichrome" tube, approximately 9 feet long and 3½ inches diameter, is provided with hand-operated covers 16 and 17 at the ends thereof, and a section is surrounded by a heating coil 18 of "Nichrome" wire wound on an aluminum oxide sleeve or core 19, the wire being covered with an insulating cement, such as "Alundum" 20. The heating coil is surrounded by a heat retaining casing 21 to maintain a uniform temperature in the furnace. The heating zone is approximately 4 feet long and is followed by a cooling zone determined by a spacing sleeve member 22 which approximates the diameter of the heating coil, the two being joined by multiple layers 23 of asbestos paper. A metallic jacket 24 is secured around the sleeve 22 and is provided with inlet and outlet ports for circulating a cooling fluid, such as water, through the jacket. A feed pipe 25 is connected to the exit end of the furnace 15 for the injection of the gaseous medium into the furnace. The carbonized anode or electrode is deposited in a metallic carrier 26 and advanced through the furnace for the required treatment.

The desulphurizing of carbonized nickel by hydrogen in a flow system at atmospheric pressure is not favorable due to the reaction of carbon with hydrogen in the formation of methane. The result is a complete removal of the carbon layer deposited on the nickel. However, when methane gas is mixed with hydrogen in the equilibrium ratio; usually from 2 to 10 per cent methane is sufficient within a temperature range of 900 to 1250° C., the amount decreasing with increase in temperature, the carbon film is not destroyed but the sulphurous matter is removed from the nickel and the carbon coating. It is essential that the last traces of oxygen and water vapor are removed from the hydrogen-methane mixture. As little as .001 per cent oxygen or water vapor will remove significant quantities of carbon from the carbonized electrode by the reaction to form carbon monoxide.

In accordance with this invention separate sources of hydrogen and methane, such as tanks 27 and 28, respectively, are provided adjacent the furnace and are connected to a mixing bottle 29 through pipes 30 and 31 for collecting the proper mixture of gases to be supplied to the furnace. Suitable valves 32 and 33 and pressure meters 34 and 35 permit the control of the flow and volume of the gases in the system. The equilibrium mixture flows through an exit pipe 36 connected to an oven 37 containing a catalyst 38, such as copper turnings, to convert oxygen to water vapor and sulphur impurities to hydrogen sulphide by reaction with hydrogen. Hydrogen sulphide and water vapor are removed in successive tubes 39 and 40 containing sodium hydroxide and lead oxide and a desiccating substance, such as "dehydrite," respectively which are partly embedded in sandboxes 41 and 42 and the purified mixture flows through the supply pipe 25 which includes a valve 43 for closing this branch of the system. The hydrogen supply of gas may be injected directly into the furnace through the three-way valve 44 and by-pass pipe 45 to flush the furnace before a treating period. During the processing of the electrode the gases are swept out of the furnace due to the pressure of the gaseous mixture and the excess hydrogen is ignited at the end of the furnace.

The gas mixture is supplied to the furnace at the rate of eight liters per minute and the heating zone of the furnace is raised to a temperature of 900° to 1050° C. The carrier 26 is advanced into the heating zone and is permitted therein from one-half to one hour to effect the reaction processes between the sulphurous compounds and the equilibrium hydrogen-methane mixture whereby sulphur, combined or uncombined in the nickel or carbon layer, is combined with hydrogen to form hydrogen sulphide and other reactions in the hot coating form carbon dioxide, carbon oxysulphide, carbon disulphide and other easily volatile gases which are removed from the carbon layer on the metal and swept out of the furnace by the pressure flow of the desulphurizing gases. This treatment removes 90 per cent of the sulphur content of the metal and the coating so that the only remaining sulphur in the electrode is about .0001 per cent, such an amount being negligible since the residue is not likely to affect the active emitter coating of a discharge device because the temperature of operation will not dissociate this sulphur from the metal.

After the carrier remains in the heating zone for the required duration of the treatment it is advanced into the cooling zone surrounded by the water jacket 24 where it remains until the temperature is reduced to approximately room temperature. The furnace construction permits the continuous treatment of carbonized nickel electrodes since the carriers may be advanced at spaced intervals in the furnace by the operation of the hand covers at the ends of the furnace.

While two embodiments of the invention have been described it is, of course, understood that various other forms of the invention may be evolved without departing from the concept of the invention. Furthermore, various details of the structures may be modified as herein described and such modifications are intended to be within the scope of the appended claims.

What is claimed is:

1. The method of desulphurizing carbon coated metal which comprises enclosing said metal in an enclosed evacuated container, heating said metal in a reducing atmosphere for an extended period to cause reaction between the sulphur compounds in the metal and carbon coating and the reducing media to selectively form sulphuous gases without changing the character of the carbon coating, removing said gases from said container, and cooling said metal.

2. The method of desulphurizing carbon coated metal which comprises enclosing said metal in a closed container free from oxygen and water vapor, heating said metal in a reducing atmosphere under static conditions at low pressure for an extended period to cause reaction between the sulphur compounds in the metal and carbon coating and the reducing media to selectively form sulphurous gases, removing said gases from said container, and cooling said metal with the carbon coating intact.

3. The method of desulphurizing carbon coated metal which comprises enclosing said metal in a closed container free from oxygen and water vapor, heating said metal in hydrogen under static conditions at reduced pressure for an extended period to cause reaction between the sulphur compounds in the metal and carbon coating and the hydrogen to selectively form sulphurous gases, removing said gases from said container, and cooling said metal with the carbon coating intact.

4. The method of desulphurizing carbon coated metal which comprises enclosing said metal in a closed container free from oxygen and water vapor, heating said metal in a hydrogen atmosphere under static conditions at reduced pressure for one hour at a temperature of 900 to 1050° C. to cause reaction between the sulphur compounds in the metal and carbon coating and the hydrogen atmosphere, to selectively form sulphurous gases, removing said gases from said container, and cooling said metal with the carbon coating intact.

5. The method of desulphurizing carbon coated metal which comprises enclosing said metal in a closed container free from oxygen and water vapor, heating said metal in a hydrogen atmosphere within a pressure range of 10 to 12 centimeters of mercury for an extended period to cause reaction between the sulphur compounds in the metal and carbon coating and the hydrogen atmosphere to selectively form sulphurous gases, removing said gases from said container, and cooling said metal with the carbon coating intact.

6. The method of desulphurizing a carbon coated electrode which comprises injecting a mixture of hydrogen and methane gases to a heating zone maintained substantially at a temperature of 1000° C. in a continuous flow, the latter being in the range of from 2 to 10 per cent, causing a reaction between sulphurous compounds in the electrode and carbon coating with the gaseous mixture under the high temperature heating conditions in said zone, introducing said electrode to said heating zone at an elevated temperature for a prolonged interval, advancing the treated electrode to a cooling zone while subjected to the gaseous mixture, and finally removing the electrode when reduced to approximately room temperature.

7. The method of desulphurizing a carbon coated electrode which comprises introducing said electrode to a heating zone of a furnace, supplying a mixture of hydrogen and methane for injection into said furnace, regulating the mixture so that the methane concentration is sufficient for equilibrium between carbon, hydrogen and methane at the heating temperature of the furnace, injecting the mixture into said furnace at the rate of approximately eight liters per minute at atmospheric pressure, heating the electrode at 1050° C. from one-half to one hour in said furnace to selectively cause reaction between sulphurous compounds in the electrode and carbon coating, removing the evolved reaction gases, advancing said electrode to a cooling zone in the same gas mixture, and finally removing said electrode from the cooling zone when reduced to room temperature.

8. The method of treating a metal having a carbon coating thereon and containing reducible impurities to remove the reducible impurities while retaining the carbon coating which comprises, heating the metal to a temperature in the neighborhood of 1000° C. in an atmosphere consisting of hydrogen and a gaseous hydrocarbon, the concentration of the gaseous hydrocarbon being maintained sufficiently high at said heating temperature to prevent substantial loss of carbon coating by reaction with hydrogen to form volatile hydrocarbon.

9. The method of selectively desulphurizing carbon coated metal which comprises, introducing said metal into an enclosed vessel, heating said metal from 950 to 1050° C. in an atmosphere consisting of hydrogen and methane to cause reaction between sulphur compounds in the metal and carbon coating to form sulphurous gases, selectively removing said sulphurous gases from said vessel while maintaining methane concentration sufficiently high to prevent substantial loss of carbon in the coating, and cooling said metal.

10. The method of selectively desulphurizing carbon coated metal which comprises, surrounding said metal with an enveloping gaseous mixture consisting of pure hydrogen and a hydrocarbon gas, the concentration of said hydrocarbon gas being at least that fixed by the equilibrium between carbon, hydrogen and the hydrocarbon gas at an elevated temperature of about 1000° C., heating said metal to said elevated temperature in the gaseous mixture, and then cooling said metal to approximately room temperature.

11. The method of selectively removing sulphur from a metal having a carbon coated surface in an atmosphere consisting of a mixture of pure hydrogen and methane, the concentration of the methane being at least that fixed by the equilibrium between carbon, hydrogen and methane at the elevated temperature between 950 and 1050° C., heating said metal to said elevated temperature whereby sulphur compounds combine with hydrogen and carbon to form volatile compounds and the methane prevents loss of carbon on the surface of the metal by reaction between carbon and hydrogen.

12. The method of selectively desulphurizing a carbon coated electrode which comprises, injecting a mixture of purified hydrogen and a hydrocarbon gas in a continuous flow to a heating zone at an elevated temperature of approximately 1000° C., the concentration of hydrocarbon gas being sufficient to prevent loss of carbon in the coating by reaction with hydrogen to create volatile hydrocarbon at said temperature, introducing said electrode to said heating zone for a prolonged period whereby reaction with sulphurous compounds occurs in said electrode and carbon coating to form sulphurous gases, removing said sulphurous gases, advancing the treated electrode to a cooling zone in a similar hydrogen and hydrocarbon mixture, and removing said electrode when cooled to room temperature.

13. The method of selectively desulphurizing a carbon coated electrode which comprises, introducing a mixture of hydrogen and methane gases in a ratio such that the methane concentration is at least equal to the equilibrium methane concentration at an elevated temperature of approximately 1000° C. in a continuous flow for reaction with the sulphurous compounds in said electrode and carbon coating to form volatile sulphurous gases which are swept from the reaction zone by the gas flow while net loss of carbon is prevented by the methane concentration, introducing said electrode to said heating zone at said elevated temperature for a prolonged interval, advancing the treated electrode to a cooling zone, and removing said electrode when reduced to approximately room temperature.

JOSHUA R. C. BROWN, Jr.
LELAND A. WOOTEN.